(12) United States Patent
Hwang et al.

(10) Patent No.: US 8,474,990 B2
(45) Date of Patent: Jul. 2, 2013

(54) VEHICLE INSIDE MIRROR DEVICE EMPLOYING BALL CLAMPS

(75) Inventors: Hyok-Joo Hwang, Buncheon (KR); Young Duck Ko, Seoul (KR); Kyung Jun Lee, Seoul (KR); Jin Gee Choi, Bucheon-si (KR)

(73) Assignee: SMR Patents S.a.r.l., Luxembourg (LU)

( * ) Notice: Subject to any disclaimer, the term of this patent is extended or adjusted under 35 U.S.C. 154(b) by 379 days.

(21) Appl. No.: 12/696,680

(22) Filed: Jan. 29, 2010

(65) Prior Publication Data

US 2010/0195230 A1  Aug. 5, 2010

(30) Foreign Application Priority Data

Jan. 30, 2009  (KR) .................... 10-2009-0007714

(51) Int. Cl.
*G02B 5/08* (2006.01)
*G02B 7/182* (2006.01)

(52) U.S. Cl.
USPC ......................................... 359/844; 359/875

(58) Field of Classification Search
USPC ................................. 359/844, 875
See application file for complete search history.

(56) References Cited

U.S. PATENT DOCUMENTS 5,984,482 A  11/1999  Rumsey et al.
2004/0195486 A1*  10/2004  Rumsey et al. ............... 248/481

FOREIGN PATENT DOCUMENTS

| KR | 86203 | 10/1994 |
| KR | 2001128380 | 3/1997 |
| KR | 200345786 | 3/2004 |
| KR | 10-0718766 | 5/2007 |

* cited by examiner

*Primary Examiner* — Jade R Chwasz
(74) *Attorney, Agent, or Firm* — Reising Ehtington PC

(57) ABSTRACT

A vehicle inside mirror device employs a ball clamp in which a barrel-shaped ball clamp is prepared by assembling a pair of semi-barrel-shaped and symmetrical bodies to accommodate for manufacturing errors and the like. The ball clamp includes a mirror through which a driver can view rearwardly; and a mirror mounting part. The mirror mounting part has a barrel-shaped hinge part. A first ball clamp surrounds and clamps the hinge part. A second ball clamp corresponds to the first ball clamp with a spring between the first ball clamp and the second ball clamp for generating an expansion force. The mirror mounting part is fixed to a glass or a ceiling of a vehicle and has a hinge part for coupling the second ball clamp thereto. A tube surrounding the first ball clamp, the second ball clamp and the spring.

8 Claims, 4 Drawing Sheets

VEHICLE INSIDE MIRROR DEVICE EMPLOYING BALL CLAMPS

The invention is based on a priority patent application KR 10-2009-0007714 which is hereby incorporated by reference.

1. Field of the Invention

The present invention relates to a vehicle inside mirror device employing ball clamps, more particular, to a vehicle inside mirror device employing ball clamps in which a barrel-shaped ball clamp is prepared by assembling a pair of semi-barrel-shaped and symmetrical bodies to absorb a mechanical error or an assembling error caused by a loosen assembly between the ball clamp and a counterpart or caused by a press-fitting manner for preventing a deformation of the ball clamp.

2. Background

A mirror is indispensably provided in a vehicle to secure a driver's sight. As the above mirror, there are an outside mirror device provided out of a passenger compartment to enable a driver to see the sides and the rear and an inside mirror device provided in a passenger compartment to enable a driver to see the rear.

In general, the above vehicle inside mirror device comprise a stay connected to a vehicle body and a mirror coupled to the stay, and provided with a safety separation means for separating the stay when a driver or a passenger hits his head on the mirror, and so a driver or a passenger can be protected from injury when a vehicle is collided.

As the article related to the vehicle inside mirror device provided with the above safety separation means, Korean Utility Model Publication No. 1989-6996 (published on Oct. 14, 1989) entitled "safety separation device for vehicle inside mirror" is disclosed, however, the article disclosed in Korean Utility Model Publication No. 1989-6996 has a drawback that a stay is extremely easily separated due to a structure in which the stay is separated by separating a bolt fixedly connected to the stay from a spring tube.

Also, as the article related to the vehicle inside mirror device provided with the above safety separation means, Korean Utility Model Registration No. 86203 (published on Oct. 22, 1994) entitled "separation structure for vehicle inside mirror" is disclosed, however, the article disclosed in Korean Utility Model Registration No. 86203 has drawbacks that since a number of parts having a complicated configuration are assembled to each other, it is difficult to assemble the complicated parts, a defect ratio is high and a manufacturing cost becomes increased.

In addition, as the article related to the vehicle inside mirror device provided with the above safety separation means, "Separating device of vehicle inside mirror" is disclosed in Korean Utility Model Registration No. 112838 (registered on Nov. 3, 1997), however, the article disclosed in Korean Utility Model Registration No. 112838 has a drawback that since an elastic support bracket should be provided on a stay, a structure of the stay becomes complicated so that it is difficult to manufacture the stay.

As another article related to the vehicle inside mirror device provided with the above safety separation means, Korean Utility Model Registration No. 20-0345786 (published on Mar. 24, 2004) entitled "vehicle inside mirror device provided with safety separation means" and having a structure in which a stay is separated by separating a plate spring secured fixedly to a stay from a base, whereby the stay is not separated extremely easily and a structure of the stay is not complicated to enable the mirror device to be manufactured easily. The vehicle inside mirror device disclosed in Korean Utility Model Registration No. 20-0345786 has the drawbacks that, since the stay is entirely separated when a vehicle is collided, an impact generated by the stay becomes large relatively and the stay is not rotated freely.

In order to solve the above drawbacks of the vehicle inside mirror device provided with the above safety separation means, the device in which a multi-joint type stay is formed to allow the stay to be rotated freely, the stay is not separated extremely easily, a structure of the stay is not complicated and an impact generated on the stay can be alleviated effectively when a vehicle is collided is disclosed in U.S. Pat. No. 5,984,482 (issued on Nov. 18, 1999) entitled "Mounting assembly for vehicle interior automatic dimming rearview mirror, Korean Patent No. 10-0718766 (published on May 9, 2007) entitled "multi-joint inside mirror device for vehicle) and the like.

In the conventional multi-joint type inside mirror device stay as described above, since a spherical ball clamp is assembled through a hook coupling, a loosen assembly between the ball clamp and a counterpart caused by a dimension difference of an outer diameter and inner diameter of the spherical ball clamp or a deformation of shape or dimension of the article caused by a press-fitting manner are created.

US2004/0195486 discloses a vehicle inside mirror device incorporating the use of ball clamps. The prior art does not solve the problem to absorb mechanical errors or assembly errors.

DESCRIPTION OF THE INVENTION

The present invention is conceived to solve the above problems of the prior art, and an object of the present invention is provide to a vehicle inside mirror device employing ball clamps in which a barrel-shaped ball clamp is prepared by assembling a pair of semi-barrel-shaped and symmetrical bodies to absorb a mechanical error or an assembling error caused by a loosen assembly between the ball clamp and a counterpart or caused by a press-fitting manner for preventing a deformation of the ball clamp.

This object is achieved by a vehicle inside mirror having each of the ball clamps of the vehicle inside mirror consisting of a pair of bodies.

As one means for achieving the above objects, the vehicle inside mirror device employing ball clamps of the present invention comprises a mirror through which a driver can view the rear; a housing surrounding the mirror; a mirror mounting part mounted to a rear side of the housing, the mirror mounting part having a barrel-shaped hinge part provided thereon; a first ball clamp surrounding and clamping the hinge part of the mirror mounting part; a second ball clamp provided at a place corresponding to the first ball clamp; a spring provided between the first ball clamp and the second ball clamp for generating an expansion force; a mounting part fixed to a glass or a ceiling of a vehicle and having a hinge part for coupling the second ball clamp thereto; and a tube surrounding the first ball clamp, the second ball clamp and the spring.

According to the invention, each ball clamp consists of a pair of bodies, the pair of bodies being connected to each other via a coupling part.

Preferably, the connecting part is made of material and has a thickness such that the connecting part can be bent to enable the pair of bodies to be coupled to each other for forming a barrel shaped single body.

Here, the pair of bodies has the semi-spherical shape or the semi-barrel shape.

Here, the pair of bodies are constructed such that a passage through a cable is passed is formed in the coupled bodies.

Preferably, the pair of bodies has guide parts formed at sides of end portions thereof opposite to the connecting parts, the guide parts are overlapped to each other.

In addition, the pair of bodies has recess parts on which a recess is formed and a protrusion to be coupled to the recess formed at the other sides of the end portions thereof opposite to the connecting parts, respectively.

Also, the recess part has the resilient to allow the protrusion to be received in or separated from the recess by the resilient.

The semi-cylindrical neck portions may be formed at lower sides of the pair of bodies, respectively.

Preferably, the bodies may be provided with reinforcing parts formed on outer circumference surfaces thereof to enhance a mechanical strength of the bodies.

The present invention has the advantage that the barrel-shaped ball clamp is prepared by assembling a pair of semi-barrel-shaped and symmetrical bodies to absorb a mechanical error or an assembling error caused by a loosen assembly between the ball clamp and a counterpart or caused by a press-fitting manner for preventing a deformation of the ball clamp.

The above and other features and advantages of the present invention will become more apparent to those of ordinary skill in the art by describing in detail preferred embodiments thereof with reference to the attached drawings.

Figure 1:
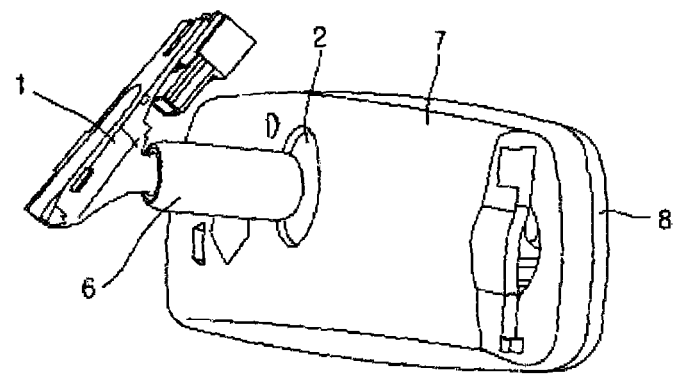
FIG. 1 is a perspective view of a vehicle inside mirror device employing ball clamps according to one embodiment of the present invention.
Figure 2:
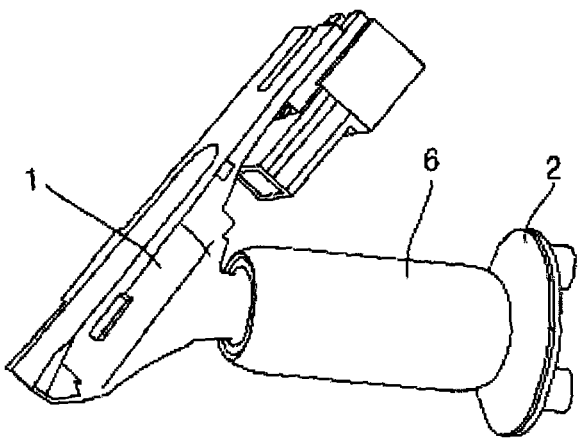
FIG. 2 is a perspective view of an essential part of a vehicle inside mirror device employing the ball clamps according to one embodiment of the present invention.
Figure 3:
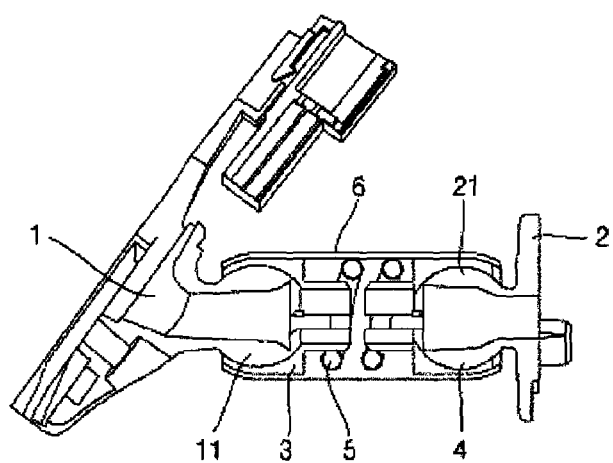
FIG. 3 is a sectional view of an essential part of a vehicle inside mirror device employing the ball clamps according to one embodiment of the present invention.
Figure 4:
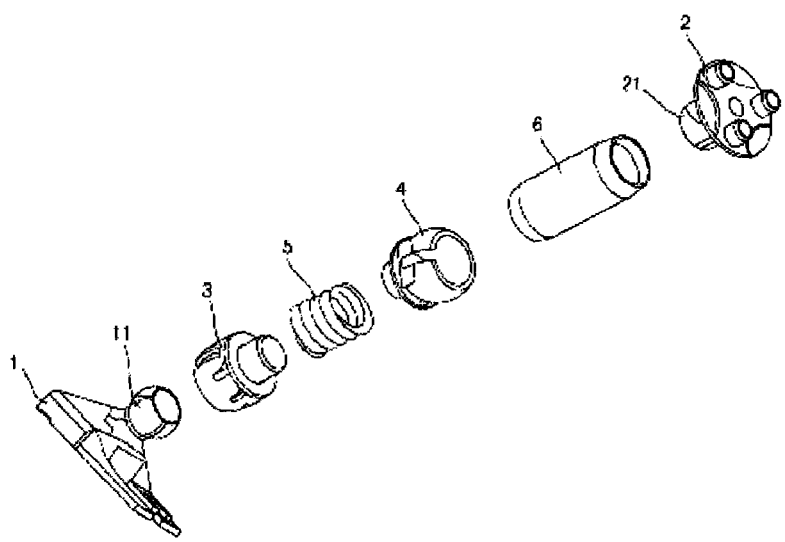
FIG. 4 is an exploded perspective view of an essential part of a vehicle inside mirror device employing the ball clamps according to one embodiment of the present invention.

FIG. 1 is a perspective view of a vehicle inside mirror device employing ball clamps according to one embodiment of the present invention, FIG. 2 is a perspective view of an essential part of the vehicle inside mirror device employing the ball clamp according to one embodiment of the present invention; FIG. 3 is a sectional view of an essential part of the vehicle inside mirror device employing the ball clamp according to one embodiment of the present invention, and FIG. 4 is an exploded perspective view of an essential part of the vehicle inside mirror device employing the ball clamp according to one embodiment of the present invention.

As shown in FIG. 1 to FIG. 4, the vehicle inside mirror device employing the ball clamps according to one embodiment of the present invention comprises a mirror (8) through which a driver can view the rear; a housing (7) surrounding the mirror (8); a mirror mounting part (2) mounted to a rear side of the housing (7), the mirror mounting part having a barrel-shaped hinge part (21) provided thereon; a first ball clamp (4) surrounding and clamping the hinge part (21) of the mirror mounting part (2); a second ball clamp (3) provided at a place corresponding to the first ball clamp (4); a spring (5) provided between the first ball clamp (4) and the second ball clamp (3) for generating an expansion force; a mounting part (1) secured to a glass or a ceiling of a vehicle and having a hinge part (110) for coupling the second ball clamp (3) thereto; and a tube (6) surrounding the first ball clamp (4), the second ball clamp (3) and the spring (5).

Figure 5:
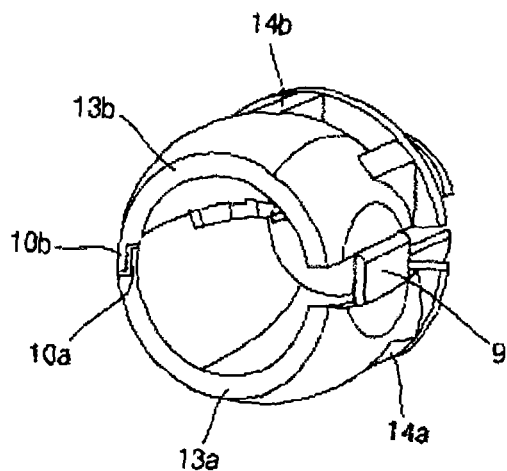
FIG. 5 is a perspective view of a ball clamp of a vehicle inside mirror device employing the ball clamps according to one embodiment of the present invention viewing from a front side.
Figure 6:
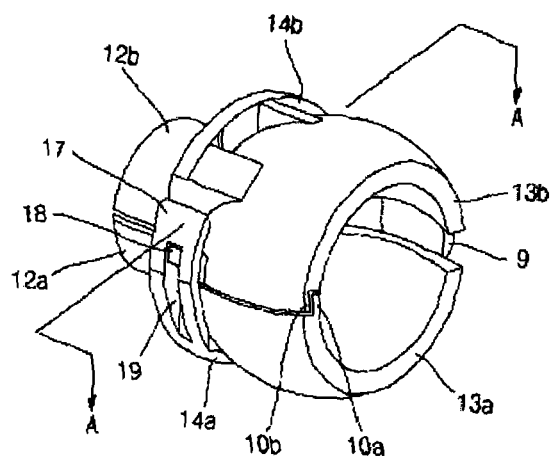
FIG. 6 is a perspective view of a ball clamp of a vehicle inside mirror device employing a ball clamp according to one embodiment of the present invention viewing from a rear side.
Figure 7:
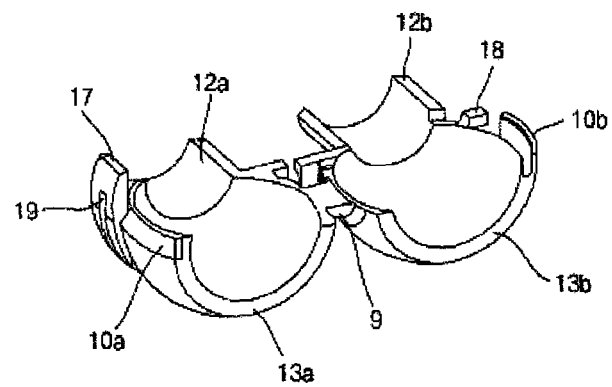
FIG. 7 is an exploded perspective view of a ball clamp of a vehicle inside mirror device employing the ball clamps according to one embodiment of the present invention viewing from a front side.
Figure 8:
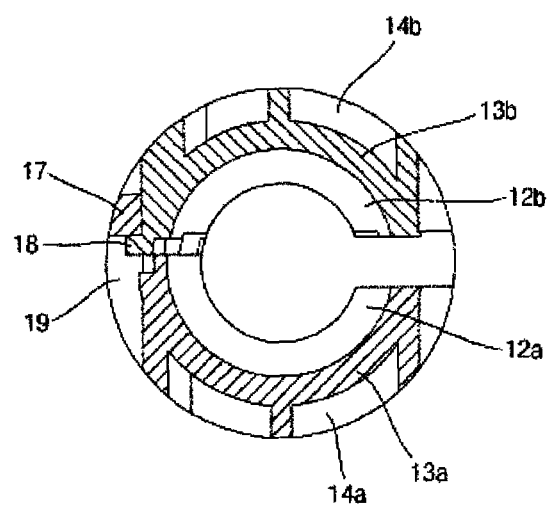
FIG. 8 is a sectional view taken along the line A-A in FIG. 6.

FIG. 5 is a perspective view of the ball clamp of the vehicle inside mirror device employing the ball clamp according to one embodiment of the present invention viewing from a front side; FIG. 6 is a perspective view of the ball clamp of the vehicle inside mirror device employing the ball clamp according to one embodiment of the present invention viewing from a rear side; FIG. 7 is an exploded perspective view of the ball clamp of the vehicle inside mirror device employing the ball clamp according to one embodiment of the present invention viewing from a front side, and FIG. 8 is a sectional view taken along the line A-A in FIG. 6.

As shown in FIG. 5 to FIG. 8, each of the ball clamps (3 and 4) of the vehicle inside mirror device employing the ball clamps according to the present invention consists of a pair of semi-barrel-shaped bodies (13a, 13b) connected to each other via a connecting part (9), guide parts (10a, 10b) are formed at sides of end portions of the semi-barrel shaped bodies (13a, 13b), which are opposite to the connecting parts (9). Also, a recess part (17) on which a recess (19) is formed and a protrusion (18) to be coupled to the recess (19) are formed at the other sides of the end portions of the semi-barrel shaped bodies (13a, 13b), which are opposite to the connecting parts (9), respectively.

The connecting part (9) is made of material and has a thickness such that the connecting part (9) can be bent to enable the pair of semi-barrel shaped bodies 13a, 13b to be coupled to each other for forming a barrel shaped single body. In a case where the pair of semi-barrel shaped bodies 13a, 13b are coupled to each other to form a barrel shaped single body, a cable such as a signal cable can be passed through a passage formed in the barrel-shaped single body.

In addition, it will be apparent to a person skilled in the art that the pair of bodies may have a semi-spherical shape to form a spherical body.

The guide parts (10a, 10b) are overlapped and coupled to each other. The protrusion (18) is coupled to the recess (19) of the recess part (17) to enable the coupled semi-barrel shaped bodies (13a, 13b) to be maintained in a coupled state. The recess part 17 has the resilient by which the protrusion (18) can be received in or separated from the recess (19).

The pair of semi-barrel shaped bodies (13a, 13b) have semi-cylindrical neck portions (12a and 13b) formed at lower portion thereof, respectively. In a case where the semi-cylindrical neck portions (12a and 13b) are coupled to each other to form a cylindrical portion, the semi-cylindrical neck portions (12a and 13b) support the spring (5).

Preferably, reinforcing parts (14a, 14b) are formed on an outer circumference surface of the pair of semi-barrel shaped bodies (13a, 13b) to enhance a mechanical strength of the semi-barrel shaped bodies (13a, 13b).

An operation of the vehicle inside mirror device employing the ball clamp according to one embodiment of the present invention caused by the above structure is as follow.

One end of the mounting part (1) is secured to a vehicle body of a front upper portion in a passenger compartment, the second ball clamp (3) is coupled to the barrel-shaped hinge (11) formed on the other end of the mounting part (1). In addition, the first ball clamp (4) is provided at a location facing the second ball clamp (3), and the barrel-shaped hinge part (21) of the mirror mounting part (2) is coupled to the first ball clamp (4), and so the inside mirror device is installed on the vehicle.

Between the second ball clamp (3) and the first ball clamp (4), the spring (5) is provided, and so a certain distance between the second ball clamp (3) and the first ball clamp (4) is maintained. In addition, since the tube (6) is provided such that the tube surround the second ball clamp (3), the first ball clamp (4) and the spring (5), the second ball clamp (3), the first ball clamp (4) and the spring (5) can be supported together.

In each of the second ball clamp (3) and the first ball clamp (4), since the pair of barrel-shaped bodies (13a, 13b) are assembled by coupling the protrusion (18) to the recess (19) of the recess part (17) and coupling the guide parts (10a, 10b) in a state where the guide parts are overlapped, although a mechanical error or an assembling error is created in a case where each of the first and second ball clamps (4 and 3) is not assembled tightly and precisely with a counterpart or is are press-fitted to a counterpart, the first and second ball clamps (4 and 3) can absorb the mechanical error or an assembling error so that deformation of the ball clamp is inhibited.

In the state where the members constituting the mirror device are coupled to each other as described above, a driver can view a rear of a vehicle through the mirror (8), so that the driver can drive safely the vehicle, and the driver can adjust an installation angle of the mirror (8) through the second ball clamp (3) and the first ball clamp (4) acting as a joint part.

In the meantime, if an impact is exerted on the mirror by a driver's head or a passenger's head when the vehicle is collided, parts coupled to the second ball clamp (3) and the first ball clamp (4) are separated so that the mirror (8) is separated. The mirror (8) is separated to allow the impact exerted to a driver or a passenger to be alleviated, so the driver or the passenger can be protected from injury.

The invention claimed is:

1. A vehicle inside mirror device employing ball clamps, comprising:
    a mirror through which a driver can view the rear;
    a housing surrounding the mirror;
    a mirror mounting part mounted to a rear side of the housing, the mirror mounting part having a barrel-shaped hinge part provided thereon;
    a first ball clamp surrounding and clamping the hinge part of the mirror mounting part, the first ball clamp including a pair of first semi-barrel shaped bodies, each connect to each other via a first connecting part;
    a second ball clamp provided at a place corresponding to the first ball clamp, the second ball clamp including a pair of second semi-barrel shaped bodies, each connect to each other via a second connecting part;
    a spring provided between the first ball clamp and the second ball clamp for generating an expansion force;
    a mounting part fixed to a glass or a ceiling of a vehicle and having a hinge part for coupling the second ball clamp thereto; and
    a tube surrounding the first ball clamp, the second ball clamp and the spring, wherein the tube defines two ends, each having a reduced diameter for retaining the first and second ball clamps and the spring therein.

2. The vehicle inside mirror device employing the ball clamps according to claim 1, wherein said first and second connecting parts are made of material and have thicknesses such that said first and second connecting parts can be bent to enable each of the two pairs of semi-barrel shaped bodies to be coupled to each other, respectively, for forming first and second barrel shaped single bodies.

3. The vehicle inside mirror device employing the ball clamps according to claim 1, wherein the pair of bodies are constructed such that a passage through a cable is passed is formed in the connected bodies.

4. The vehicle inside mirror device employing the ball clamps according to claim 1, wherein the pair of bodies have guide parts formed at sides of end portions thereof opposite to the connecting parts, the guide parts are overlapped to each other.

5. The vehicle inside mirror device employing the ball clamps according to claim 1, wherein the pair of bodies have recess parts on which a recess is formed and a protrusion to be coupled to the recess formed at the other sides of the end portions thereof opposite to the connecting parts, respectively.

6. The vehicle inside mirror device employing the ball clamps according to claim 1, wherein the recess part is resilient to allow the protrusion to be received in or separated from the recess by the resiliency.

7. The vehicle inside mirror device employing the ball clamps according to claim 1, wherein the pair of bodies have semi-cylindrical neck portions formed lower sides thereof, respectively.

8. The vehicle inside mirror device employing the ball clamps according to claim 1, wherein the bodies are provided with reinforcing parts formed on outer circumference surfaces thereof, respectively, to enhance a mechanical strength of the bodies.

* * * * *